United States Patent [19]

Klinger

[11] 3,797,304
[45] Mar. 19, 1974

[54] TORQUE LOAD APPLYING TESTING APPARATUS

[76] Inventor: Friedrich Klinger, Kafkastrasse 30, Arheligen, Germany

[22] Filed: Feb. 24, 1972

[21] Appl. No.: 228,836

[30] Foreign Application Priority Data
Mar. 8, 1971 Germany............................ 2110951

[52] U.S. Cl...................................... 73/99, 73/118
[51] Int. Cl. .......................................... G01m 13/02
[58] Field of Search............ 73/99, 118, 162, 136 R, 73/136 A, 136 B, 136 C, 136 D

[56] References Cited
FOREIGN PATENTS OR APPLICATIONS
1,193,039  5/1970  Great Britain .................... 73/136 R 171,615  10/1965  U.S.S.R................................. 73/99

*Primary Examiner*—Jerry W. Myracle
*Attorney, Agent, or Firm*—Wolfgang G. Fasse

[57]  ABSTRACT

The present testing apparatus applies torque loads to test samples. The test sample and a torque transmitting member are arranged to have substantially the same main axis, whereby one end of the test sample and the respective end of the torque transmitting member are connected to each other in a force transmitting manner, whereas the opposite end of the test sample and the corresponding opposite end of the torque transmitting member are coupled to wind up said opposite ends relative to each other.

19 Claims, 4 Drawing Figures

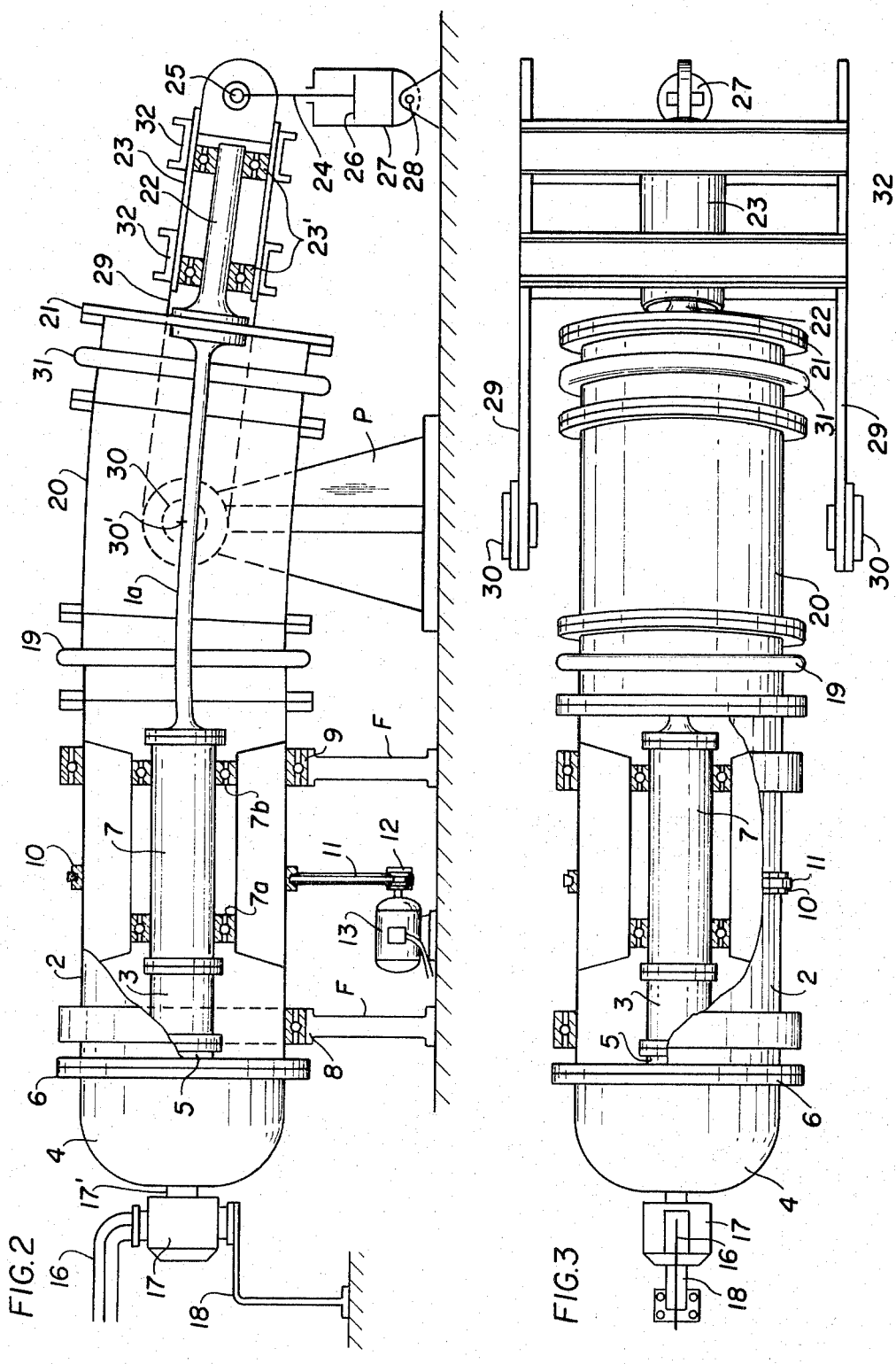

TORQUE LOAD APPLYING TESTING APPARATUS

BACKGROUND OF THE INVENTION:

The invention relates to a torque load applying testing apparatus, especially a torque circulating test rig for subjecting structural members to simulated operating conditions. The torque circulating test rig has a hydraulic torque actuator functioning as a member in a closed mechanical system according to a wind-up type of loading. It is the purpose of this type of testing apparatus to ascertain the useful life or the mechanical strength of structural members which are subject to a torque load in their actual operation, whereby material faults or flaws which might be present are to be detected.

Structural members which are subject to torque loads comprise, for example, universal joint shafts, axles, clutches and so forth. In order to achieve meaningful test results for these structural members, it is necessary to subject them to test conditions which simulate the actual operating conditions as much as possible.

In prior art testing equipment the sample to be tested, hereafter referred to as the test sample, is tested either under static conditions or while the test sample rotates. When the test sample is tested in a stand-still or static condition, the arrangement is such that one end of the test sample is rigidly chucked while the other end is subjected to any desired torque load. It is also known to use so-called brake testing stands and torque circulating test rig for testing the structural members under any desirable torque loads while simultaneously rotating the test sample.

In the brake testing stand the test sample is connected with a driven end to a motor and with a driving end to a brake, for example, a hydraulic brake. The mechanical power supplied by the motor for producing the required torque is transformed by the brake into heat. This is a disadvantage especially where brake testing devices are employed for testing structural members which are constructed for transmitting high energies because this entails the use of large power generators and respective consumers in order to produce the required energy and to convert it again. Another disadvantage of brake testing stands is seen in their relatively large fly wheel mass which entails low, natural frequencies.

The so-called torque circulating test rigs employ reversing gear means for returning the torque applied to the test sample from the output end or driving end back to the driven or input end of the sample. The required torque load to be applied to the sample is produced by means of a special torque actuator. Generally, so-called torque circulating test rigs have the advantage that the driving power or energy must supply the friction losses in the bearings and gear means in order to keep the closed mechanical system with series of test samples, gear means, and connecting shafts in rotation. However, the need for two reversing or detour gear means which are required in these torque circulating test rigs constitute a disadvantage because they must be constructed for transmitting the full power under which the test is to be performed as well as for a useful life. Accordingly, these reversing gear means are rather expensive. Another disadvantage of the torque circulating test rigs is seen in that they entail low frequency resonance or natural frequencies which may disturb rather substantially the performance of a testing program or sequence.

OBJECTS OF THE INVENTION

In view of the foregoing, it is the aim of the invention to achieve the following objects singly or in combination:

to overcome the drawbacks of the prior art, more specifically, to provide a testing facility which will simulate the actual operating conditions for a specific test sample as much as possible whereby the test sample is to be subjected to torque loads and/or also to bending loads whereby one or the other or both loads are to be applied when the test sample is in a static condition or when it is rotated;

to provide a testing facility which will avoid the large heat loss entailed by so-called brake testing stands;

to avoid the use of reversing gear means in connection with torque circulating test rigs;

to provide a testing apparatus which will have natural or resonant frequencies higher than prevailing in prior art torque circulating test rigs;

to provide means by which during the testing itself, it is possible to measure the torque load applied to the test sample and/or the torsional angle of the test sample; and to provide a testing apparatus for subjecting especially universal joint shafts or the like to a torque load and simultaneously to a bending moment which is substantially free of shearing forces.

SUMMARY OF THE INVENTION

According to the invention the above objects have been achieved in a testing apparatus for applying a torque load to a test sample wherein the test sample and torque load transmitting means have first and second free ends whereby the respective first ends are interconnected with each other in a force locking manner whereas the respective second or opposite ends are winded-up relative to each other by a torque actuator or the like. Preferably, the test sample and the torque load transmitting means each have a main axis which are arranged coaxially relative to each other or substantially coaxially relative to each other. In the present testing facility the test sample will preferably be arranged inside of the torque transmitting means, for example, in the form of an outer coaxial torque transmitting rigid pipe or tubular member. In a modified embodiment the test sample may be connected between the adjacent free ends of an outer torque transmitting member and an inner torque transmitting member arranged coaxially relative to each other. The latter arrangement is especially suitable for testing a clutch.

Further, the invention teaches to construct a preferred embodiment in such a manner that the test sample and the torque actuator as well as the torque transmitting means form an integral rotatable unit which is rotatably supported in stationary means, preferably by bearings and which is rotated by drive means about a common rotational axis.

A measuring shaft for ascertaining the torque load may be inserted between the test sample and the torque actuator as a series connected link so to speak forming a force locking connection between the test sample and the torque actuator.

BRIEF FIGURE DESCRIPTION

In order that the invention may be clearly understood, it will now be described, by way of example, with reference to the accompanying drawings, wherein:

FIG. 2 is a side view partially in section of another embodiment of the invention wherein longitudinal test samples such as shafts may be subjected to a torque load as well as to a bending moment;

FIG. 3 is a top view onto the embodiment illustrated in FIG. 2; and

DETAILED DESCRIPTION OF EXAMPLE EMBODIMENTS

Figure 1:
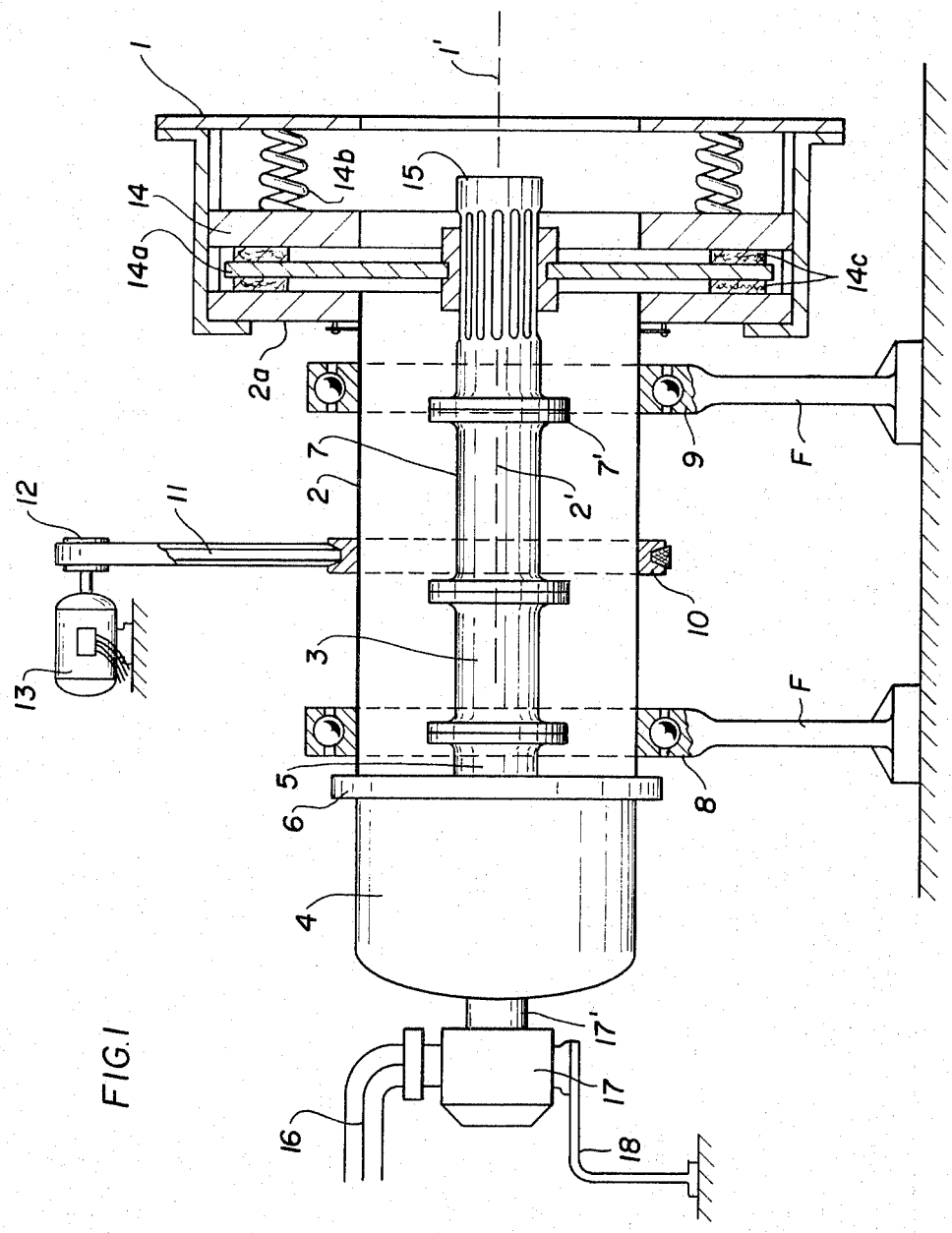
FIG. 1 illustrates partially in section a torque load applying testing apparatus according to the invention operating as so-called torque circulating test rig and especially suitable for testing, for example a clutch.

Referring to FIG. 1 there is shown a torque circulating test rig according to the invention, wherein the test sample 1 is, for example, a clutch having an main axis 1'. Torque transmitting means in the form of a tubular member 2 comprise a main rotational axis 2'. The torque transmitting means comprise a further member, for example, in the form of shaft sections 7 and 15 arranged coaxially inside the tubular member 2. The shaft sections may be interconnected, for example, by conventional flanging means 7'.

The test sample 1 is connected in a force locking manner to the right hand free ends of the torque transmitting members 2 and 15. The left hand ends of the torque transmitting members are wound-up relative to each other by means of a torque actuator 4 well known in the art. For this purpose, the torque actuator 4 is connected to the tubular torque transmitting member 2 through a flange 6 and the shaft section 7 is connected to a shaft 5 extending out of the torque actuator 4 by a measuring shaft 3. The measuring shaft 3 is rigidly flanged on the one hand to the shaft section 7 and and on the other hand to the shaft 5. These torque measuring shafts are also well known in the art. The torque actuator 4 subjects the series of shaft sections 3, 5, 7 and 15 to torsion which is opposite to the torque transmitting element 2.

The torque actuator 4 may, for example, comprise a hydraulically operated rotational cylinder which is actuated through flexible conduits 16 connected to a source of hydraulic power not shown. In order to avoid twisting of the conduits 16 when the torque actuator 4 rotates, there is provided a coupling head 17 connected with an input flange to the conduits 16 and restrained against rotation by a flexible rod 18 which in turn is connected to the supporting structure of the apparatus. The valve head 17 has a rotating output conduit 17' connected to the rotating torque actuator 4.

The test sample 1 in the form of a clutch comprises friction blocks 14 which press a disc 14a under the force of springs 14b against a flange 2a rigidly secured to the right hand free end of the torque transmitting member 2. If desired, friction increasing means 14c may be inserted between the blocks 14 and the disc 14a as well as between the flange 2a and the disc 14a. The disc 14a is further rigidly secured in a force transmitting manner to the right hand free end of the inner torque transmitting member 15. Due to the just described connection of the test sample 1 to the right hand free ends of the inner and outer torque transmitting members and since the torque actuator 4 rotates the shaft sections 3, 5, 7, and 15 opposite to the rotation of the outer torque transmitting member 2, the test sample 1 is subjected to opposite torques of equal value.

According to the invention, the test sample 1, the torque actuator 4, the measuring shaft 3 and the torque transmitting means 2, 7 and 15 are arranged in a closed mechanical system as an integral rotational unit having a common rotational axis 1', 2'. The rotational unit is rotatably supported in a frame structure F, for example, by means of bearings 8 and 9. The entire above described rotational unit is rotated, for example, by a motor 13 operatively connected with its drive pulley 12 through a V-belt 11 to a pulley ring 10 rigidly secured to the outer surface of the torque transmitting member 2, for example, by a weldment.

The torque actuator 4 may be provided with an angular measuring device, not shown, capable of ascertaining the relative angle between the shaft section 5 and the flange 6 and thus the torsional angle of the test sample 1.

Basically, any structural member arranged in a force locking actuater manner between the flange 6 at the housing of the torque actuator 4 and the shaft 5 thereof may be subjected to the testing procedure. In other words, the torque transmitting member 2, e.g., may be considered to be the test sample. In any event, the arrangement will be such that all other members of the torque transmitting series or chain except for the test sample, will be made sufficiently strong or rather torsionally stiff so that the deformations of these other members will remain sufficiently small to be neglected and that in addition the lowest natural or resonance frequency of the closed mechanical system is substantially higher than the highest testing frequency which may occur in any testing program.

FIG. 2 illustrates a side view in a somewhat schematic fashion of a testing apparatus according to the invention adapted for testing longitudinal test samples 1a. FIG. 3 is a top view on the embodiment of FIG. 2. The test sample 1a may, for example, be an elastic spring rod which is to be subjected to a torque load as well as to a bending stress or to a rotating bending stress which shall be free of any shearing force in order to simulate as truly as possible the type of load which will occur under an actual operating condition. The elements or structural members which are the same as those in FIG. 1 are provided with the same reference numerals.

In order to accomodate a longitudinal test sample 1a, the torque transmitting tubular member 2 is provided with an extension 20 flanged to the right hand free end of the tubular member 2. More specifically, the connecting means between the tubular member 2 and its extension 20 comprise an intermediate connecting member 19 having flexible characteristics with regard to bending moment but rigid characteristics relative to torque loads. The right hand, free end of the extension member 20, which incidentally is also a tubular member, is connected to the free end of the test sample 1a by means of flanges and a second intermediate member 31 which is also flexible with regard to bending but rigid with regard to torque loads, and a cover member 21 connected to the respective flange for example by nuts and bolts not shown. The cover member 21 provides a force locking rigid interconnection between the free end of the intermediate member 31 and thus of the extension member 20 and the free end of the test sample 1a, as well as between said intermediate member 31 and an outwardly extending free end 22. The free end 22 may be flanged to the cover member 21 and coaxially relative to the main axis of the integral rotational unit.

The free end 22 is rotatably supported in a sleeve 23, for example by bearings 23'. Thus, the free end 22 may rotate along with the integral rotational unit while the sleeve 23 may be maintained in a non-rotating but movable status. In order to move the sleeve 23 and with it the free end 22 for applying a bending moment to the test sample 1a, there is provided a piston cylinder arrangement, the cylinder 27 of which is connected to the frame structure by a hinge 28. The piston 26 is connected with its piston rod 24 to the sleeve 23 through a joint 25.

In order to properly guide the bending movement imparted to the free end of the testing apparatus, there is provided a hinged frame structure comprising lateral bars 29 hinged to rigid posts or frame members P by journals or hinges 30. The lateral guide bars 29 are interconnected with each other by cross bars 32 which are simultaneously connected to the sleeve 23, however, in a manner so as to permit a sliding adjustment or movement between the sleeve 23 and the cross bars 32. The just described hinged frame structure guides the free end 22 of the torque transmitting extension member 20 along a curve which has its center in the axis 30' of the hinges 30. Preferably, the hinging axis 30' is defined as to its location by a point of intersection between tangential lines applied to the bending curve of the test sample 1a at the points where the test sample is rigidly connected or chucked to the testing apparatus. This bending curve is circular where the test sample has a rod shape and is subjected to a pure bending load that is, a bending load free of any shearing force.

The inner end of the test sample 1a is rigidly connected to the intermediate shaft section 7 which may, as shown in FIGS. 2 and 3, be supported in a rotational manner relative to the torque transmitting tubular member 2, for example by bearings 7a and 7b. The rigid connection of the inner end of the test sample 1a to the rigidly but rotatably supported shaft section 7 assures that the test sample 1a may be subjected to a pure bending load. The left hand end of the intermediate shaft section 7 is rigidly connected through the measuring shaft 3 to the shaft 5 whereby a connection to the torque actuator 4 is provided which connection is rigid against rotation. Thus, if the shaft 5 is rotated by the torque actuator 4 relative to the torque transmitting member 2 by an angle, such angular rotation is transmitted to the left hand end of the test sample 1a through the measuring shaft 3 and the intermediate shaft section 7 to which the inner end of the test sample 1a is connected as described. Accordingly, the inner end of the test sample 1a is twisted or rotated by said angle relative to its end which is connected to the cover member 21.

The above described oppositely directed twisting of both ends of the test sample 1a accomplishes the desired torque load. As in the embodiment of FIG. 1, all the structural elements which in the embodiment of FIGS. 2 and 3 participate in the transmitting of a torque moment, will be made sufficiently rigid relative to the test sample 1a and relative to the transmittal of a torque load so that the deformations of these torque load transmitting members will remain sufficiently small to be neglected. Furthermore, the lowest natural or resonance frequency of the restrained system will, due to said torsional rigidity be substantially higher than the highest test frequency in any test sequence or program.

Incidentally, the rigid support provided for the torque transmitting member 2 by the frame members F and the bearings 8 and 9 assures sufficient reaction forces in these bearings 8 and 9 in order to equalize the force which is applied to the free end 22 by the piston 26 through the joint or journal member 25 as described above.

Due to the just described arrangement of the apparatus, the integral unit of the testing apparatus is freely rotatable about the longitudinal axis of said integral unit. This rotation is accomplished in the same manner as described above with reference to FIG. 1 by the drive means 10 to 13.

The measurements or testing steps may be performed on the test sample when it is in a static condition as well as when it is rotating. Thus, in the embodiment of FIGS. 2 and 3, the test sample 1a may be subjected to a bending load in a static condition or to a rotating bending load during the rotational movement of the test sample 1a. In both instances a torque load may be superimposed on the bending load or the tests may be run with a torque load alone in the static condition of the test sample as well as when it rotates. These multiple test conditions or combination of test conditions constitute a substantial advantage of the apparatus according to the invention and thus a substantial advance in the art.

The above loads may be applied statically as well as dynamically. The dynamic torque load is preferably applied by means of torque actuator means 4 which are controlled or regulated by servo hydraulic means. The torque actuators are capable of achieving high testing frequencies provided the closed mechanical system is stiff relative to torque.

The actual testing loads are ascertained by measuring the torque loads or the torque angle caused by such loads. In the alternative, other quantities may also be measured or ascertained directly at the test sample for example by means of expansion or acceleration measurements which are converted into signals representing such measured values. These measured value signals are compared in a regulating circuit with rated value signals applied to a comparator in said regulating circuit. Such comparator means are well known in the art and hence not shown. However, a regulating or controlling output signal of the comparator may be applied to a control valve for the conduits 16.

Figure 4:
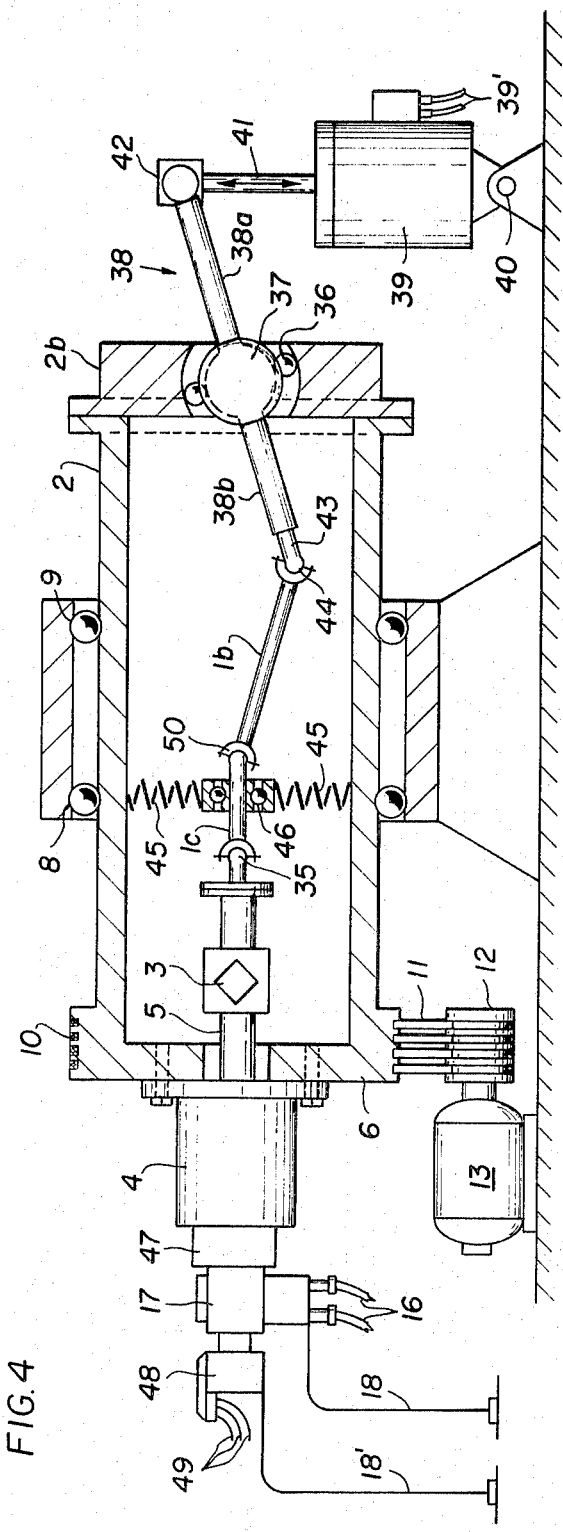
FIG. 4 illustrates still another embodiment according to the invention also capable of subjecting a longitudinal test sample to a torque load as well as to a bending moment.

FIG. 4 illustrates a further embodiment of the apparatus according to the invention which is quite similar in its function to the embodiment shown in FIGS. 2 and 3 but which differs in its structural features. In FIG. 4 the same elements are again provided with the same reference numerals. The torque transmitting means comprise again the tubular member 2 which is closed at its right hand end by a cover 2b flanged to the free end of the tubular member 2. A longitudinal force transmitting bar 38 extends through an aperture 36 in the cover member 2b in such a manner that it may journal about a diameter axis but is simultaneously prevented from rotation about its longitudinal axis. Connecting means 37 such as a universal joint, a roller coupling, or a membrane are provided for supporting the rod 38 in the aperture of the closure 2b. The outer end 38a of the bar 38 is pivoted as by a pivot joint 42 to drive means such as a piston cylinder arrangement 39, 41. The inner end 38b of the bar 38 is connected to the test sample 1 b.

The test sample 1b is a universal joint shaft and includes a shaft section 1c. Such a divided shaft may, for instance, be the Cardan shaft in a motor vehicle. The test sample is arranged inside of the torque transmitting tubular member 2. The left hand end of the shaft section 1c is directly connected through a universal joint 35 to the measuring shaft 3 which in turn is connected to the shaft or axle 5 of the torque actuator 4. The measuring shaft 3 comprises means for ascertaining the torque load and such shafts are well known in the art.

The torque produced by the torque actuator 4 is measured by the measuring shaft 3 and is transmitted through pick-up means 48 to electrical wiring 49. Th pick-up means 48 may comprise, for example, slip or sliding rings and the wiring 49 is connected to evaluation equipment not shown. In addition to picking-up the torque, it is also possible to ascertain the angular twisting applied to the test sample. For this purpose an angle measuring device 47 is connected to the torque actuator 4.

The aperture 36 in the cover 2b is large enough to accomodate the connecting means 37 which, as mentioned, may, for example, be a well known roller joint coupling or a membrane which permits the hinging of the bar 38 intermediate its ends in see-saw fashion but which simultaneously prevents the rotation of the bar 38 about its longitudinal axis and independently of the torque transmitting member 2. The bar 38 rotates along with the member 2 but not relative thereto. The see-saw movements are imparted to the bar 38 by the piston cylinder arrangement 39, 41 which is hinged to the frame structure by a journal joint 40. The piston rod 41 is connected to the outer end 38a in such a manner that the rod may rotate relative to the piston rod 41. This is accomplished for example by a ball joint 42. The inner end 38b is directly connected to the test sample 1b, for example, by means of the Cardan joint 44 forming part of the test sample 1b. However, if desired, the inner end 38b may be provided with a telescoping extension 43 as shown in FIG. 4.

When the bar 38 is brought into a tilted position by the piston cylinder arrangement 39, 41 and when the torque is supplied simultaneously by means of the torque actuator 4, the test sample 1b, 1c is subjected at its universal joints 35, 50 and 44 to the same load conditions as are applied to a Cardan shaft in a motor vehicle; namely, torque loads combined with the simultaneous angular or tilted rotation of the just mentioned universal joints.

Where the test sample comprises several sections as shown in FIG. 4, it may be preferable to support at least one partial section inside the tubular member 2. In FIG. 4 the test sample section 1c adjacent to the measuring shaft 3 is elastically supported by means of springs 45 and a bearing 46. The springs 45 are secured at one end thereof to the inner surface of the tubular member 2 and at the other end thereof to the bearing 46. The just described supporting means 45, 46 make it possible to subject even the universal joint 35 of the test sample to a tilting under test conditions.

Incidentally, the torque transmitting member 2 is again driven by drive means 10, 11, 12 and 13 as described above. The pick-up means 48 are supported against rotation by an elastic rod 18' in the same manner as has been described above with regard to the coupling head 17.

Advantages of the invention are seen in that the present testing apparatus avoids the large energy losses which occur in connection with brake testing stands. The invention further avoids the expensive reversing gear means used heretofore in so-called restraining testing stands. Another very important advantage is seen in that the lowest resonant frequency of the present apparatus may be substantially increased as compared to prior art devices because, according to the invention, all structural members of the testing apparatus can be coaxially through as rigid as desired.

Although the invention has been described with reference to specific example embodiments, it is to be understood, that it is intended to cover all modifications and equivalents within the scope of the appended claims.

What is claimed is:

1. A torque load applying testing apparatus for a sample to be tested, comprising a rotatable hollow cylinder, stationary means, bearing means for rotatably supporting said hollow cylinder in said stationary means, torque actuator means having a first torque member coupled to one end of said hollow cylinder and a second torque member extending substantially coaxially relative to said hollow cylinder, means for coupling said test sample to said second torque member and to said hollow cylinder and wherein said coupling means extend coaxiallythrough said hollow cylinder toward the other end of the hollow cylinder whereby the test sample may be attached to said other end of the hollow cylinder and to the coupling means adjacent to said other end of the hollow cylinder.

2. The apparatus according to claim 1, wherein said hollow cylinder is a rigid pipe, said apparatus further comprising drive means operatively connected to said hollow cylinder for rotating the hollow cylinder.

3. The apparatus according to claim 1, wherein said coupling means comprise a torque measuring shaft, said second torque member being connected to one end of said torque measuring shaft, the other end of which is connected to said test sample, whereby the measuring shaft is force locked between said second torque member and said test sample.

4. The apparatus according to claim 1, wherein said hollow cylinder itself is the test sample, whereby the coupling means are arranged inside the hollow cylinder, and means for connecting the other end of the hollow cylinder to said coupling means.

5. A torque load applying testing apparatus for a sample to be tested, comprising a rotatable hollow cylinder, stationary means, bearing means for rotatable supporting said hollow cylinder in said stationary means, torque actuator means having a first torque member coupled to one end of said hollow cylinder and a second torque member extending substantially coaxially relative to said hollow cylinder, means for coupling said test sample to said second torque member and to said hollow cylinder, wherein said coupling means comprise a longitudinal shaft having a diameter axis and a longitudinal axis as well as an inner end reaching into said hollow cylinder and an outer end extending out of said hollow cylinder, hinge means for hinging said shaft intermediate its ends to the other end of the hollow cylinder whereby the shaft is tiltable about its diameter axis and locked against rotation about its longitudinal axis, and means for attaching said inner end of said longitudinal shaft to said test sample, said apparatus further comprising tilting means and pivot means for pivotally connecting said tilting means to the outer end of the longitudinal shaft.

6. The apparatus according to claim 5, wherein said tilting means comprise a piston cylinder arrangement.

7. The apparatus according to claim 5, further comprising telescoping means arranged to interconnect said inner end of said shaft and said test sample.

8. The apparatus according to claim 7 wherein said telescoping means form part of said inner end of said shaft.

9. The apparatus according to claim 5, further comprising means for supporting at least a portion of said test sample inside said hollow cylinder and relative thereto, said supporting means including spring means and bearing means, said spring means being connected at one end thereof to the inside of said hollow cylinder and at the opposite end to said bearing means, said bearing means being connected to said portion of the test sample to permit the free rotation of the test sample.

10. The apparatus according to claim 5, wherein said tilting means comprise means for journaling said tilting means to said stationary means.

11. A torque load applying testing apparatus for a sample to be tested, comprising a rotatable hollow cylinder, stationary means, bearing means for rotatably supporting said hollow cylinder in said stationary means, torque actuator means having a first torque member coupled to one end of said hollow cylinder and a second torque member extending substantially coaxially relative to said hollow cylinder and means for coupling said test sample to said second torque member and to said hollow cylinder, said hollow cylinder comprising cylinder extension means, said coupling means comprising first connecting means for tiltably securing one end of said cylinder extension means to said hollow cylinder, said first connecting means being rigid relative to a torque load and bendable by a bending moment, and second connecting means for securing the other end of said cylinder extension means to said test sample, said cylinder extension means comprising a free end, said apparatus further comprising rotatable bearing means secured to said free end, and tilt means operatively connected to said rotatable bearing means for tilting the cylinder extension means relative to a longitudinal axis of the apparatus.

12. The apparatus according to claim 11, wherein said rotatable bearing means comprise a sleeve and bearings in said sleeve for rotatably securing said free end of said cylinder extension means in said sleeve, said tilt drive means comprising a piston cylinder arrangement and joint means for operatively linking said piston cylinder arrangement to said sleeve.

13. The apparatus according to claim 12, wherein said coupling means comprise third connecting means which, as said first connecting means, is also rigid with regard to a torque load and bendable by a bending moment, said third connecting means being interposed between said cylinder extension means and said free end of said cylinder extension means.

14. The apparatus according to claim 13, further comprising tiltable guide support means for said free end, and cross bars for connecting said tiltable guide support means to said sleeve, said cross bars being displaceable along said sleeve.

15. The apparatus according to claim 14, wherein said tiltable guide support means comprise a hinged frame including rigid means, lateral bars, journal means for hinging said lateral bars to said rigid means, and wherein said cross bars interconnect said lateral bars and said sleeve.

16. The apparatus according to claim 15, wherein said test sample is a rod having two supported ends and which is bent together with said cylinder extension means by a bending moment free of any shearing force to form a bending curve, said journal means defining a hinging axis for said hinged frame extending through a point of intersection between two tangential lines applied to said bending curve at said two supported ends of said test sample rod.

17. The apparatus according to claim 11, wherein said torque actuator means comprise shaft means and further bearing means for rotatably supporting said shaft means inside said hollow cylinder, said coupling means comprising means for securing said test sample to said free end of the cylinder extension means and to said rotatably supported shaft means whereby the test sample extends inside said cylinder extension means substantially coaxially therewith, said further bearing means permitting applying a bending moment substantially free of shearing stress to the test sample.

18. An apparatus for testing rotating, torque transmitting structural elements, comprising a hollow cylinder having a rotational axis and first and second ends, stationary means, bearing means supported by said stationary means for rotatably supporting said hollow cylinder, torque actuator means having a first member and a second member, means for connecting said first torque actuator member to said first end of said hollow cylinder so that said second torque actuator member extends concentrically in the direction of said rotational axis and into said hollow cylinder, a torque measuring shaft, means for connecting one end of said torque measuring shaft to said second torque actuator member, cover means for closing the second end of said hollow cylinder, and means for connecting a structural element to be tested to the other end of said torque measuring shaft and to said cover means.

19. An apparatus for testing rotating, torque transmitting structural elements, comprising a hollow cylinder having a rotational axis and first and second ends, stationary means, bearing means supported by said staitonary means for rotatably supporting said hollow cylinder, torque actuator means having a first member and a second member, means for connecting said first torque actuator member to said first end of said hollow cylinder so that said second torque actuator member extends concentrically in the direction of said rotational axis and into said hollow cylinder, a torque measuring shaft, means for connecting one end of said torque measuring shaft to said second torque actuator member, an extension shaft connected to the other end of said torque measuring shaft, and means for connecting a structural element to be tested to said extension shaft and to said hollow cylinder.

* * * * *

UNITED STATES PATENT OFFICE
CERTIFICATE OF CORRECTION

Patent No. 3,797,304  Dated March 19, 1974

Inventor(s) Friedrich Klinger

It is certified that error appears in the above-identified patent and that said Letters Patent are hereby corrected as shown below:

[76]    Arheilgen, Germany

[73]    Assignee:    Firma Carl Schenck
                                Maschinenfabrik GmbH
                                61) Darmstadt Darmstadt, Germany Signed and sealed this 1st day of October 1974.

(SEAL)
Attest:

McCOY M. GIBSON JR.          C. MARSHALL DANN
Attesting Officer             Commissioner of Patents